(No Model.) 2 Sheets—Sheet 1.

D. WILDE.
GRAIN METER.

No. 544,803. Patented Aug. 20, 1895.

Witnesses
Geo. R. Hamlin

Inventor
Daniel Wilde
per Rhesa G. ——
Attorney (No Model.) 2 Sheets—Sheet 2.
D. WILDE.
GRAIN METER.
No. 544,803. Patented Aug. 20, 1895.
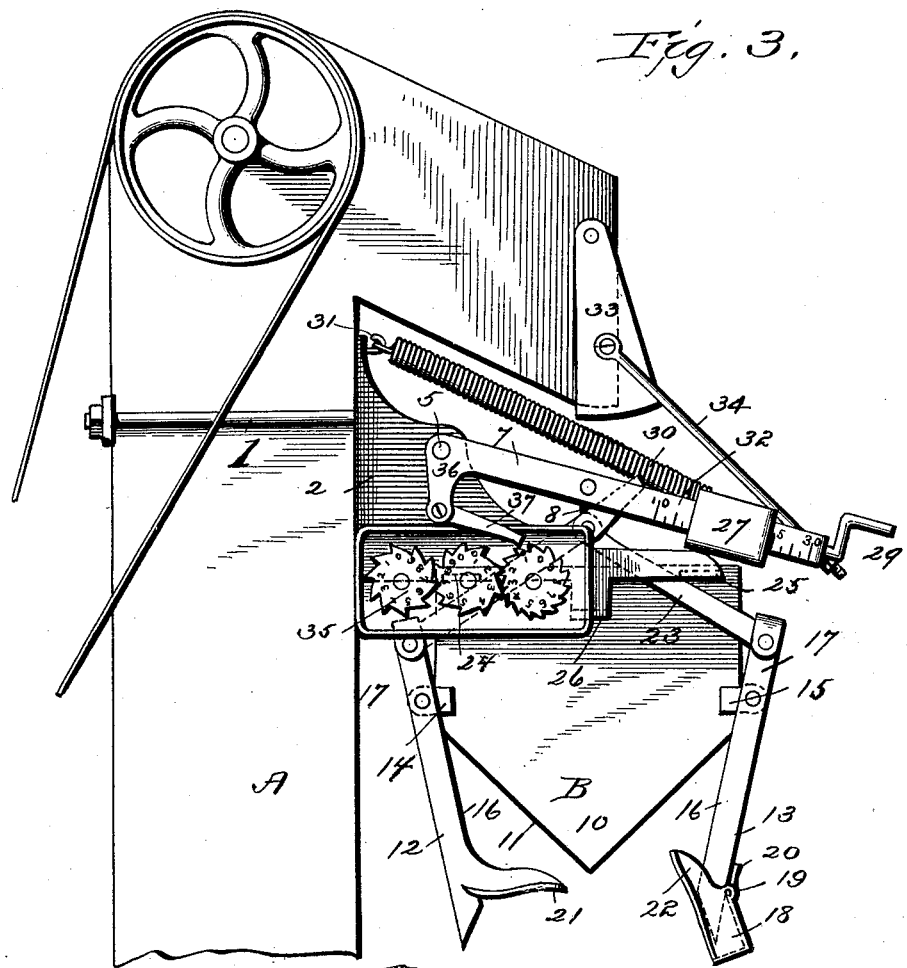
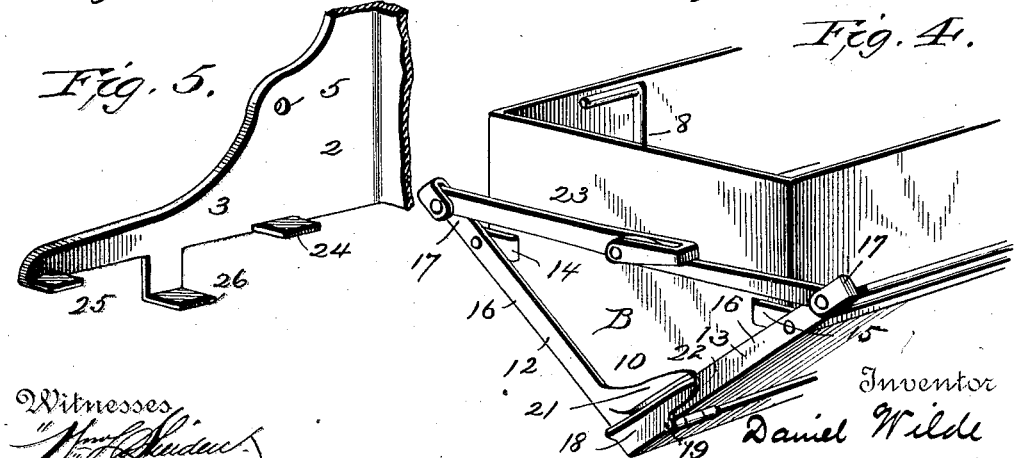
Witnesses
Inventor
Daniel Wilde
Attorney

UNITED STATES PATENT OFFICE.

DANIEL WILDE, OF WASHINGTON, IOWA.

GRAIN-METER.

SPECIFICATION forming part of Letters Patent No. 544,803, dated August 20, 1895.

Application filed February 19, 1895. Serial No. 539,007. (No model.)

*To all whom it may concern:*

Be it known that I, DANIEL WILDE, a citizen of the United States, residing at Washington, in the county of Washington and State of Iowa, have invented certain new and useful Improvements in Grain-Meters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to weighing devices, and more particularly to double-trap-bottom grain-meters. Heretofore devices of this class, wherein the vertically-movable hopper is spring-retracted, have been more or less unsatisfactory, owing to the fact that the hopper would not remain in discharging position a sufficient length of time for all the grain contained therein to be discharged therefrom. This was due to the position of the retracting-springs and the well-known fact that the resistance of a spring increases in a given ratio as it is subjected to tension, if an extension-spring, or to compression if a compression-spring. Consequently in devices of this class when the hopper descended the tension of the springs increased to such an extent that after the greater portion of the grain had been discharged from the hopper the weight of the portion remaining was overcome by the superior retractive force exerted by the springs and the hopper was made to ascend, leaving a residuum still within. This naturally caused much inaccuracy in weighing.

It is the object of my present invention to so dispose and combine the retractive spring or springs in relation to the hopper and its coacting parts as to entirely obviate the difficulty heretofore mentioned and provide a grain-meter which will be extremely efficient and accurate and of such form as to be readily attached to any grain-elevator chute.

With these objects in view my invention consists in certain improvements in the trap-bottom of the grain-hopper, its operating mechanism, and the hopper-retracting devices, and in such other features and combinations of parts as will be more fully described hereinafter, and pointed out in the claims.

Figure 1:
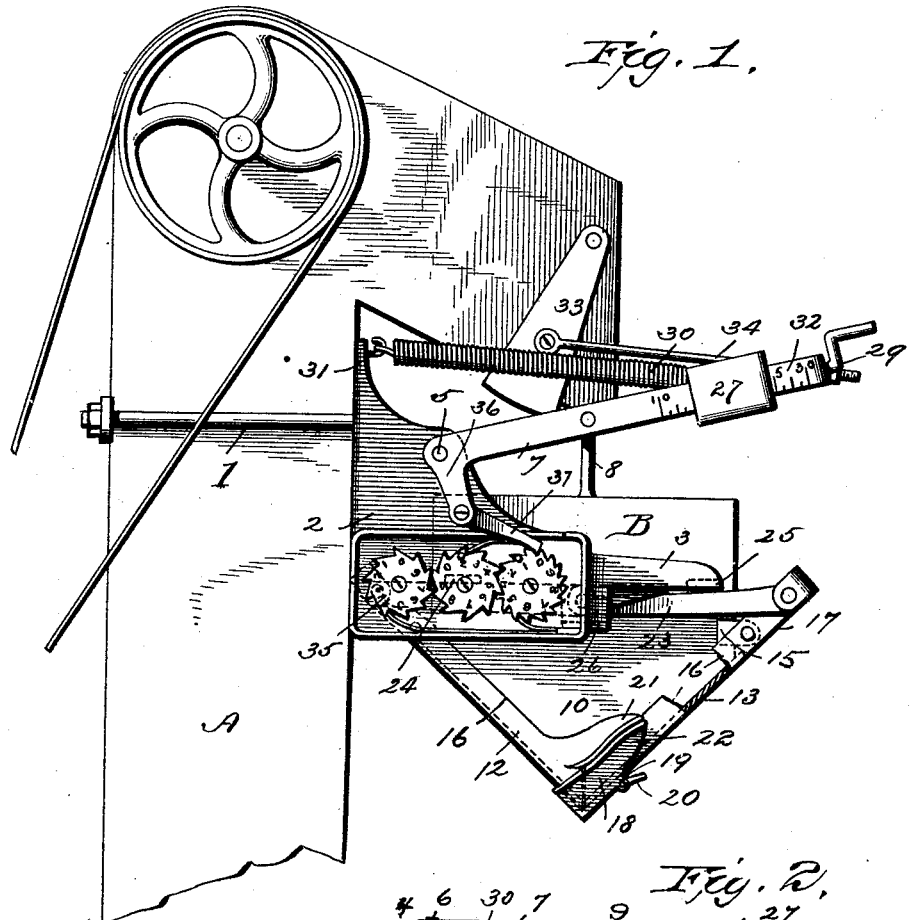
Figure 2:
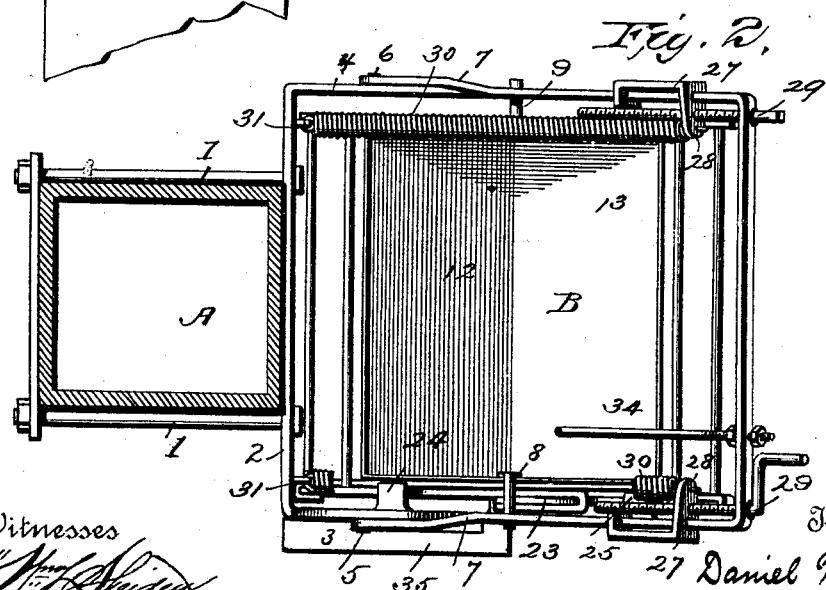

In the accompanying drawings, Figure 1 represents a side elevation of my complete invention, showing the hopper in position to receive grain from the grain-elevator, parts being shown in dotted lines and the tally-box cover removed; Fig. 2, a plan view, parts being broken away; Fig. 3, a like view as Fig. 1, but with the hopper in discharging position; and Figs. 4 and 5, enlarged detail views.

A represents the delivery-spout of a grain-elevator, to which is securely attached, by means of fastening devices 1, a framework 2, having forks 3 and 4, respectively. Fulcrumed at 5 and 6, respectively, to the framework 2 is another and substantially U-shaped hopper-supporting frame 7. Fulcrumed in and hung from the frame 7, by means of hangers 8 and 9, is a grain-weighing hopper B, which is so disposed as to normally be in position to receive grain from the grain-elevator or delivery-spout. The construction of the hopper B may be readily understood from an inspection of Fig. 3 of the drawings, in connection with the following description. This hopper is a rectangular structure and open at both top and bottom, but is provided with V-shaped depending ends 10 and 11, respectively. The hopper is also kept normally closed beneath by means of a trap-bottom formed of the valves 12 and 13, which are hinged, respectively, to sets of ears 14 and 15, projecting from the opposite sides of the said hopper, the valves abutting against the ends 10 and 11 to form the hopper-bottom. Each of these valves is provided with a flange 16 at either end thereof, and these flanges serve to prevent grain from prematurely escaping from the hopper at these points. These flanges are extended upward to form arms 17, which serve a purpose described later.

To further insure the retention of the grain within the hopper until the requisite amount has been discharged therein from the grain-elevator, I provide one of the valves with an angular lip 18, which is hinged to the valve at 19, a lug 20 allowing it a limited backward movement when the valve is open. The lip 18 is operated through the agency of the fingers 21 and 22. The finger 21 is secured to the valve 12 and the finger 22 to the movable lip 18, and when the valves are closed through mechanism which will now be described these fingers engage to keep the lip normally held across the apex formed by the juncture of the valves. If desired, another pair of fingers may be employed on the opposite end of the hopper, although it is generally found unnecessary.

To the arms 17 at one end of the hopper is pivoted a pair of toggle-levers 23, one of these levers being provided with a looped portion, which is adapted to override the upper edge of the other lever to limit the downward movement of both, and hence insure a proper closure of the hopper-valves when the hopper is in normal position. Stops or lugs 24 and 25, projecting from the fork 3, are so disposed as to respectively abut against the toggle-lever 23 to keep the hopper-valves closed and the hopper in position to receive the grain when the said hopper is in normal position. Another stop 26, projecting from the fork 3 immediately beneath the knee of the toggle-levers, acts to force the knee upward and unlocks the latter when the hopper descends, the weight of the grain, together with that of the valves, serving to throw the levers the remainder of the distance upward until they open the proper width to allow the escape of the grain. If necessary, two pairs of toggle-levers may be employed, one being placed at each end of the hopper.

As heretofore stated, one of the principal features of my present device lies in the position of the hopper sustaining and retracting spring or springs and their co-operating mechanism, and they will now be described.

27 represent sleeves or collars, which are adapted to slide on the side portion of the frame 7. These collars are provided with inwardly-projecting ears 28, which are tapped and threaded, so that the collars may be adjusted on the said frame by means of screw-threaded adjusting-bolts 29, and these bolts may be provided with crank-handles, if desired.

30 represents the hopper-retracting coil spring or springs which I employ. One end of each of these springs is secured to an ear 28 of the collar 27 and the other end fastened to one of the eyes 31, projecting from the framework 2. The eyes 31 are so placed that when the hopper is in discharging position, as shown in Fig. 3, the longitudinal axis of the springs 30 will lie very nearly parallel with the side bars of the hopper-frame 7. Owing to this construction the increased power gained by these springs as they are stretched when the hopper descends is entirely overcome by the increasing leverage gained by the hopper-frame 7 over the said springs. Thus in practice I find that, given a load of, say, twenty pounds within the hopper necessary to start the same downward to discharge its contents, only one-half that weight, or ten pounds, will keep the said hopper in discharging position. This feature possesses great advantages over devices of this class, inasmuch as it allows the hopper to descend immediately and with increasing speed when a given weight of grain is received and to remain in discharging position until it has discharged its entire contents. The side bars of the hopper-frame 7 are provided with a series of graduations, as shown at 32, so that the collars 27 may be adjusted to the numeral representing the number of pounds to be received by the hopper.

33 represents the grain cut-off, which is operated from the hopper-frame 7 by means of a rod 34. I prefer to actuate the cut-off from the hopper-frame rather than directly from the hopper, because, owing to the substantially horizontal position of the rod 34 in the present device, the vibration of the cut-off caused by the operation of the thrasher will not cause it to act prematurely, which might be the case if it were attached to the hopper.

The register or tally is shown at 35 and is operated directly from the hopper-frame through the agency of a short lever 36 and a pawl 37. This latter construction possesses advantages, inasmuch as the load in the hopper is not registered until it has been discharged therefrom and the hopper has begun to ascend.

Briefly described, the device operates in the following manner: When the mechanism is set to weigh a given load of grain and the grain-elevator is in operation, as soon as the hopper receives the amount required it will descend and the supply of grain from the grain-elevator be arrested by the cut-off 33. The downward movement of the hopper causes the stop 26 to engage with and force the toggle-levers 23 upward, which in turn liberates the valves 12 and 13, allowing the grain to discharge. The springs 30 now overcome the weight of the empty hopper and the latter is made to ascend, thereby bringing the toggle-levers 23 into contact with the stops 24 and 25, which draws the levers down into locked position and closes the valves. At the same time the load previously in the hopper is registered and the cut-off returns to its normal position, allowing the hopper to be refilled.

It is evident that my device could be varied in many slight ways such as might suggest themselves to a skilled mechanic, and I therefore do not limit myself to the precise construction herein shown and described, but consider myself entitled to all such variations as come within the spirit and scope of my invention.

Having thus described my invention, what I claim as new, and desire to secure by Letters Patent, is—

1. In a grain meter, the combination with a movable grain hopper, of a hopper-retracting spring so disposed that when the hopper moves against the retractive action of the said spring to discharge its load of grain, the superior retractive power thus gained by the spring over the opposing weight of the hopper and its contents, and which is due to the said spring being put under varying stress, will be neutralized.

2. In a grain meter, the combination with a grain hopper, and a hopper-frame movable therewith, of a spring hopper-retracting device so disposed that when the hopper moves against the retractive action of the said spring device to discharge its load of grain, the superior retractive power thus gained by the spring over the opposing weight of the hopper and its contents and which is due to the said spring device being put under varying stress, will be neutralized.

3. In a grain meter, the combination with a grain hopper, and a pivoted hopper-frame movable therewith, of spring hopper-weighing and retracting devices connected to the free end of the hopper-frame and so disposed as to lie in substantially parallel relation to the plane of the said hopper-frame when the hopper assumes its discharging position, whereby the superior retractive power thus gained by the said spring hopper-weighing and retracting devices, over the opposing weight of the hopper and its contents and which is due to the said spring hopper-weighing and retracting devices being put under varying stress, is neutralized.

4. In a grain meter, the combination with a pivoted hopper-frame, and hopper pivoted thereto and movable therewith, of weighing and retracting spring devices, and adjusters connecting the spring devices to the free extremity of the hopper-frame whereby the weighing and retractive force exerted thereon may be regulated.

5. In a grain meter, a grain hopper comprising the combination of a receptacle open at top and bottom, valves pivoted to the receptacle and adapted to normally close to form a substantially V-shaped bottom, and a lip hinged to one of the valves, and adapted to normally cover the juncture of the valves.

6. In a grain meter, the combination of valves forming a V-shaped bottom of a grain hopper, a lip hinged to one of the valves, fingers, respectively, on the lip, and on the other valve, whereby the apex formed by the juncture of the valves when the hopper is in normal position is covered, and a stop to limit the backward movement of the lip.

7. In a grain meter the combination of a spring-retracted pivoted frame, a grain hopper carried by the frame, a trap-bottom formed of valves hinged to the grain hopper, a lip hinged to one of the said valves and adapted to cover the juncture of the valves when the hopper is in normal position, toggle-levers connecting the valves, lugs adapted to engage with the toggle-levers to keep the valves closed when the hopper is being filled, and open when in discharging position.

In witness whereof I affix my signature in presence of two witnesses.

DANIEL WILDE.

Witnesses:
RHESA G. DU BOIS,
WM. H. DE LACY.